(12) United States Patent
Shin (10) Patent No.: US 12,130,803 B2
(45) Date of Patent: Oct. 29, 2024

(54) BLOCKCHAIN DATA SEARCH METHOD

(71) Applicant: UNIQUECODE CO., LTD., Seoul (KR)

(72) Inventor: Ho Yeol Shin, Seoul (KR)

(73) Assignee: UNIQUECODE CO., LTD., Seoul (KR)

( * ) Notice: Subject to any disclaimer, the term of this patent is extended or adjusted under 35 U.S.C. 154(b) by 0 days.

(21) Appl. No.: 17/767,433

(22) PCT Filed: Aug. 26, 2020

(86) PCT No.: PCT/KR2020/011432
§ 371 (c)(1),
(2) Date: Apr. 7, 2022

(87) PCT Pub. No.: WO2021/071089
PCT Pub. Date: Apr. 15, 2021

(65) Prior Publication Data
US 2023/0053590 A1      Feb. 23, 2023

(30) Foreign Application Priority Data

Oct. 7, 2019   (KR) ..................... 10-2019-0123595

(51) Int. Cl.
*G06F 16/00*       (2019.01)
*G06F 16/176*       (2019.01)
(Continued)

(52) U.S. Cl.
CPC ........ *G06F 16/2379* (2019.01); *G06F 16/176* (2019.01); *G06F 16/1815* (2019.01);
(Continued)

(58) Field of Classification Search
CPC .... G06F 16/2379; G06F 16/245; G06F 16/27; G06F 16/2465; G06F 16/1837;
(Continued)

(56) References Cited

U.S. PATENT DOCUMENTS 10,360,668 B1 *  7/2019  McGregor ............ G06T 7/0002
10,491,375 B2 *  11/2019  Maggu .................. G06Q 50/18
(Continued)

FOREIGN PATENT DOCUMENTS

KR    10-2017-0010481 A    2/2017
KR    10-2019-0008163 A    1/2019
(Continued)

OTHER PUBLICATIONS

Shan Jiang et al., "Privacy-Preserving and Efficient Multi-Keyword Search over Encrypted Data on Blockchain", 2019 IEEE International Conference on Blockchain (Blockchain) Jul. 2019, (pp. 405-410).*
(Continued)

*Primary Examiner* — Sriama Channavajjala
(74) *Attorney, Agent, or Firm* — MARSHALL, GERSTEIN & BORUN LLP (57) ABSTRACT

A blockchain data search method is proposed, the method including receiving a search term for identifying a block from a user terminal, and selecting a blockchain network to be searched from among multiple blockchain networks; accessing the selected blockchain network to enter the search term and thus searching the selected blockchain network for a block corresponding to the search term; receiving data stored in the searched block from the selected blockchain network; and transmitting the received data to the user terminal.

8 Claims, 8 Drawing Sheets

(51) Int. Cl.
| | |
|---|---|
| *G06F 16/18* | (2019.01) |
| *G06F 16/188* | (2019.01) |
| *G06F 16/22* | (2019.01) |
| *G06F 16/23* | (2019.01) |
| *G06F 16/245* | (2019.01) |
| *G06F 16/2455* | (2019.01) |
| *G06F 16/28* | (2019.01) |
| *H04L 9/00* | (2022.01) |
| *H04L 9/06* | (2006.01) |
| *H04L 9/32* | (2006.01) |

(52) U.S. Cl.
CPC ........ *G06F 16/1865* (2019.01); *G06F 16/188* (2019.01); *G06F 16/2255* (2019.01); *G06F 16/245* (2019.01); *G06F 16/24565* (2019.01); *G06F 16/289* (2019.01); *H04L 9/0637* (2013.01); *H04L 9/0643* (2013.01); *H04L 9/3236* (2013.01); *H04L 9/50* (2022.05)

(58) Field of Classification Search
CPC .... G06F 16/2255; G06F 9/4401; G06F 9/542; G06F 9/50; G06F 16/176; G06F 16/1815; G06F 16/188; G06F 16/1865; G06F 16/24565; G06F 16/289; G06Q 40/04; G06Q 20/223; G06Q 20/10; G06Q 30/018; G06Q 50/26; H04L 9/50; H04L 9/0637; H04L 9/0643; H04L 9/3236
See application file for complete search history.

(56) References Cited

U.S. PATENT DOCUMENTS

| | | | | |
|---|---|---|---|---|
| 11,062,284 | B1* | 7/2021 | Cunningham | A63F 13/71 |
| 11,516,000 | B2* | 11/2022 | Jayachandran | G06F 16/1805 |
| 2017/0140408 | A1* | 5/2017 | Wuehler | G06Q 30/0207 |
| 2017/0344435 | A1* | 11/2017 | Davis | G06F 16/9014 |
| 2018/0096752 | A1* | 4/2018 | Ovalle | H01B 3/46 |
| 2018/0101560 | A1* | 4/2018 | Christidis | H04L 9/3236 |
| 2018/0137196 | A1* | 5/2018 | Han | G06F 16/9535 |
| 2018/0139278 | A1* | 5/2018 | Bathen | H04L 9/3247 |
| 2018/0227293 | A1* | 8/2018 | Uhr | H04L 9/3268 |
| 2018/0293583 | A1* | 10/2018 | Rhie | G06Q 20/02 |
| 2019/0058582 | A1 | 2/2019 | Pathak et al. | |
| 2019/0213633 | A1* | 7/2019 | Kokernak | G06Q 30/0277 |
| 2019/0260573 | A1* | 8/2019 | Goto | G06Q 10/0833 |
| 2019/0260715 | A1* | 8/2019 | Suzuki | H04L 9/0618 |
| 2019/0391979 | A1* | 12/2019 | Bistram | G06F 16/27 |
| 2020/0090143 | A1* | 3/2020 | Iervolino | G06Q 20/065 |
| 2020/0104428 | A1* | 4/2020 | Bier | H04L 9/3239 |
| 2020/0211092 | A1* | 7/2020 | Sarin | G06Q 10/087 |
| 2020/0242081 | A1* | 7/2020 | Lee | G06F 16/1834 |
| 2020/0250176 | A1* | 8/2020 | Padmanabhan | G06F 16/27 |
| 2020/0389492 | A1* | 12/2020 | Zheng | H04L 9/3213 |
| 2021/0081400 | A1* | 3/2021 | Park | H04L 9/3239 |
| 2021/0083876 | A1* | 3/2021 | Harms | G06Q 20/0658 |

FOREIGN PATENT DOCUMENTS

| | | |
|---|---|---|
| KR | 10-2019-0058922 | 5/2019 |
| KR | 10-2019-0096231 | 8/2019 |
| KR | 10-2124942 | 6/2020 |
| WO | WO2019071026 A1 * | 4/2019 |
| WO | WO2019086127 A1 * | 5/2019 |
| WO | WO2019120325 A2 * | 6/2019 |
| WO | WO 2019213779 A1 * | 11/2019 |

OTHER PUBLICATIONS

Yang Yang et al., "Blockchain-Based Verifiable Multi-Keyword Ranked Search on Encrypted Cloud With Fair Payment", IEEE Access, Sep. 2019, (vol. 7, pp. 140818-140832).*

International Search Report and Written Opinion for PCT/KR2020/011432, mailed Nov. 25, 2020.

Devin Finzer, "Klaytn NFTs are coming to OpenSea," Retrieved from Internet at: <https://opensea.io/blog/articles/klaytn-nfts-are-coming-to-opensea> (Mar. 29, 2021).

Opensea, "Building an NFT marketplace with OpenSea co-founder Alex Atallah | OpenSea," Retrieved from Internet at: <https://www.youtube.com/watch?v=zpKTYxnT19Y> (Aug. 17, 2021).

Polygon Labs, "Polygon's Breakthrough Year: 2021 in Review," Retrieved from Internet at: <https://polygon.technology/blog/polygons-breakthrough-year-2021-in-review> (Jan. 3, 2022).

PR Newswire, "Klaytn NFTs are Now Coming to OpenSea," Retrieved from Internet at: <https://www.prnewswire.com/news-releases/klaytn-nfts-are-now-coming-to-opensea-301256560.html> (Mar. 28, 2021).

Satoshi Nakamoto, "Bitcoin: A Peer-to-Peer Electronic Cash System," (Oct. 31, 2008).

* cited by examiner

| block number | number of transmission times | transmission contents |
|---|---|---|
| #19636895 2018-02-06T16:17:54 | 51 | transfer (6) vote (28) comment (10) custom_json (5) comment_options (2) |
| #19636894 2018-02-06T16:17:51 | 47 | custom_json (5) vote (26) account_update (2) comment (10) transfer (2) comment_options (2) |
| #19636893 2018-02-06T16:17:48 | 63 | vote (36) comment (8) transfer (5) limit_order_create (2) custom_json (6) comment_options (1) delete_comment (1) claim_reward_balance (3) account_create_with_delegation (1) |

BLOCKCHAIN DATA SEARCH METHOD

TECHNICAL FIELD

The present invention relates generally to a data search method in a blockchain network.

BACKGROUND ART

Recently, the fourth industrial revolution has become an issue through the convergence of information and communication technologies. Automation in the existing industry means that a machine passively operates according to a program input in advance. Meanwhile, automation in the fourth industrial revolution means that a machine actively identifies a situation and operates according thereto. The fourth industrial revolution is led by artificial intelligence, robot technology, and life science. Particularly, the blockchain, which is attracting attention as a core element technology of the fourth industrial revolution, is a technology that manages files that record transaction information in a P2P network, in a distributed manner.

Since such blockchain technology can store information in a distributed manner, the blockchain technology has attracted attention as a technology for storing general information as well as transaction records.

However, various operating entities operate their respective blockchain networks, and users must access each blockchain network when they want to search for information. Herein, searching each blockchain network for information is not easy for general users, not experts such as programmers.

In this regard, Korean Patent Application Publication No. 10-2019-0096231 discloses a blockchain-based information management and providing system, the system including: first and second file storages encrypting and storing customer information encrypting and storing customer information including medical information and product purchase information; a key storage server generating and storing an encryption key for encrypted customer information stored in the first and second file storage and storing pre-stored customer signature information in order to determine whether the customer has approved the sharing and disclosure of encrypted customer information; a metadata server generating a virtual file by matching the customer identification information (ID) corresponding to the encrypted customer information; a search server preparing a list of encrypted customer information and disclosing customer information in each list when a customer approves the sharing and disclosure of customer information, and cataloging the disease distribution by customer's gender and age and products with high sales volume and preventing detailed customer information from being disclosed when the customer does not approve the sharing and disclosure of customer information, in response to a search expression based on the first and second file storage; and a management server controlling the combination of the encrypted customer information in the first and second file storage, controlling approval of the sharing and disclosure of customer information from customers, and encrypted customer information.

The patent document merely provides a system for storing and managing information in a specific manner, and does not enable users to conveniently search across multiple blockchain networks.

DISCLOSURE

Technical Problem

An embodiment of the present invention has an objective to provide a method by which a user easily can search for data stored in a block without directly accessing the blockchain network.

Technical Solution

A blockchain data search method according to an embodiment of the present invention includes receiving a search term for identifying a block from a user terminal, and selecting a blockchain network to be searched from among multiple blockchain networks; accessing the selected blockchain network to enter the search term and thus searching the selected blockchain network for a block corresponding to the search term; receiving data stored in the searched block from the selected blockchain network; and transmitting the received data to the user terminal, wherein the search term may be a hash value or a block number.

The search term may be entered in a form of a QR code.

The receiving may include receiving the search term from the user terminal and then providing the user terminal with blockchain network candidates in which a block is capable of being searched for using the search term on the basis of a type of the search term; and selecting any one from among the blockchain network candidates as the blockchain network by the user terminal.

The transmitting the received data to the user terminal may include, when the data stored in the found block is a URL link, accessing a specific data storage server corresponding to the URL link to transmit data received from the specific data storage server to the user terminal.

The data received from the specific data storage server may be an image or a video.

The transmitting the received data to the user terminal may include, when the data stored in the found block indicates a specific service, executing a client of the specific service to transmit the received data to the user terminal.

The specific service may be at least one of a messenger service, a news providing service, a music providing service, and a game.

The method may further include, between the receiving of the search term and the accessing of the selected blockchain network, receiving a private key from the user terminal, to release security of the selected blockchain network using the received private key and a public key.

Advantageous Effects

According to an embodiment of the present invention, a user can easily search for data stored in a block by simply entering a search term and a blockchain network name without having to directly access the blockchain network.

According to an embodiment of the present invention, when data stored in a block is a URL link, a user can directly receive an image, a video, etc. stored in a data storage server corresponding to an URL link without a procedure of accessing the URL link.

According to an embodiment of the present invention, when data stored in a block corresponds to a specific service, a user can directly receive a result of executing specific service without executing the specific service.

MODE FOR INVENTION

Based on the principle that the inventor can appropriately define the concept of terms in order to explain his or her invention in the best way, terms or words used in the present specification and claims should be interpreted as meaning and concept conforming to the technical spirit of the present invention.

Throughout the specification, when a part "includes" a certain component, this means that other components may be further included instead of being excluded, unless specifically stated to the contrary.

In addition, when one component is said to be "connected", "transmitted", "sent", "received", or "transferred" to other component, this includes not only the case where one component is directly connected, transmitted, sent, received, or transferred to another component, as well as the case where one component is indirectly connected, transmitted, sent, received, or transferred to another component with still another component in between.

In addition, terms such as "part", "module", and "device" described in the specification mean a unit that processes at least one function or operation, and may be implemented as hardware, software, or a combination of hardware and software.

Hereinafter, embodiments of the present invention will be described in detail with reference to the accompanying drawings.

Figure 1:
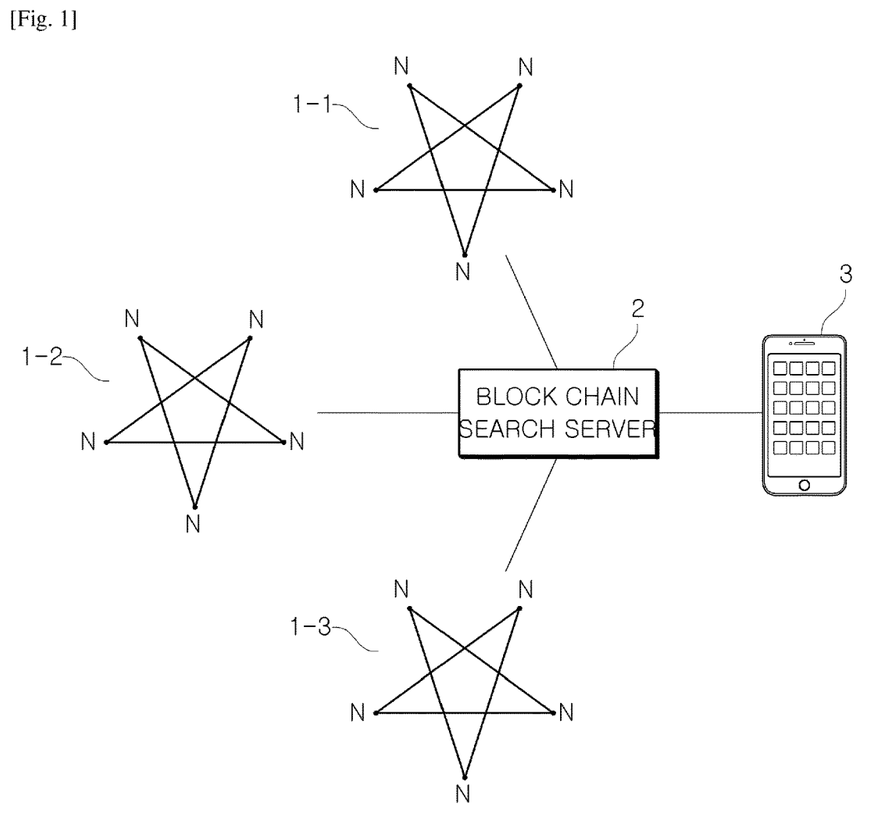
FIG. 1 is a diagram showing the configuration of a blockchain search system according to an embodiment of the present invention.

FIG. 1 is a diagram showing the configuration of a blockchain search system according to an embodiment of the present invention.

Referring to FIG. 1, the blockchain search system includes multiple blockchain networks 1, a blockchain search server 2, and a user terminal 3.

The multiple blockchain networks 1 include blockchain networks 1-1, 1-2, and 1-3 operated by different operating entities. Each of the blockchain networks 1-1, 1-2, and 1-3 includes a plurality of nodes N, in which a block is stored in each node N.

The blockchain search server 2 receives a search term for identifying a block, from the user terminal 3; when selecting a blockchain network to be searched from among the multiple blockchain networks, enters the search term by accessing the selected blockchain network, in order to search the selected blockchain network for the block corresponding to the search term; receives data stored in the found block from the selected blockchain network; and transmits the received data to the user terminal.

When a user enters a search term for identifying a block, and selects a blockchain network to be searched from among the multiple blockchain networks, the user terminal 3 transmits the entered search term and the selected blockchain network to the blockchain search server 2.

The user terminal 3 may be, for example, a mobile phone, a computer, or a laptop, and program or application in which a blockchain data search method according to an embodiment of the present invention is implemented may be installed and executed.

According to an embodiment, the search term may be any one of a hash value, a key value, and a QR code value.

The search term will be described with reference to FIGS. 2 to 3.

Figure 2:
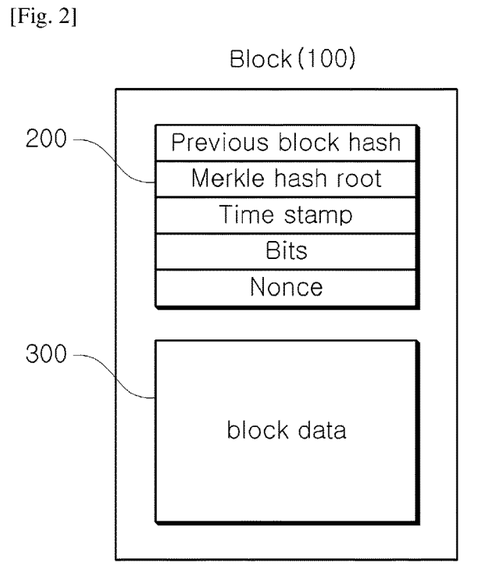
FIG. 2 is a diagram showing an example of a structure of a block generated at a node of FIG. 1.

FIG. 2 is a diagram showing an example of a structure of a block generated at a node N of FIG. 1.

Referring to FIG. 2, the block 100 is divided into a block head 200 and a block body 300. In the block head 200, previous block hash, Merkle hash root, timestamp, Bits, and Nonce are stored.

The previous block hash is a hash value obtained by hashing the previous block header using a hash function. In the case of a bitcoin, a hash value obtained by hashing the previous block header twice using a SHA-256 hash function, that is, a value of SHA-256 (SHA-256 (previous block header)) is stored.

The Merkle hash root is a hash value located at the root of the tree when configuring the transaction hash of the transaction information included in the current block in the form of a binary tree.

The timestamp represents a creation time of the block.

The Bits represents the difficulty target for a proof-of-work algorithm of the block.

The Nonce is a counter for finding a value lower than a specific target value.

In this embodiment, since a block is specified by the previous block hash, the hash value may be used as a search term.

Figure 3:
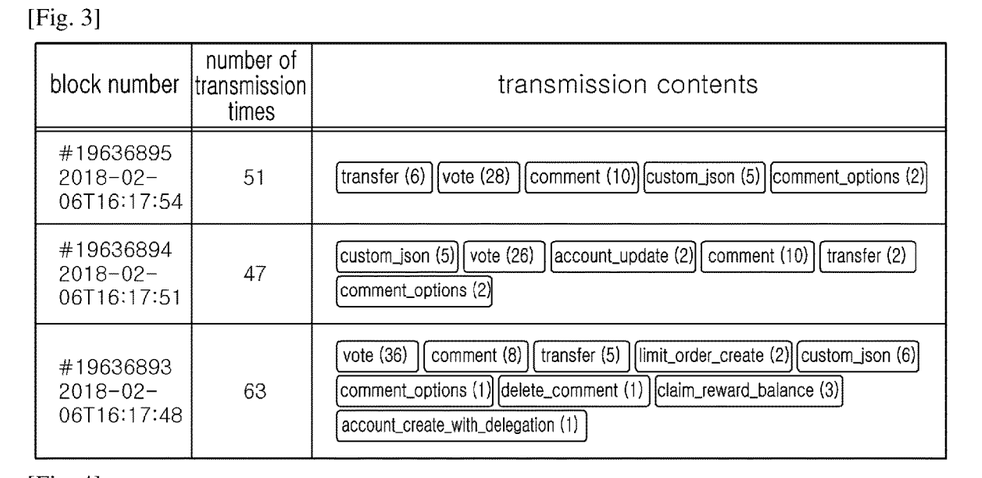
FIG. 3 is a diagram showing an example of a structure of a block generated at a node of FIG. 1.

FIG. 3 is a diagram showing an example of a structure of a block generated at a node N of FIG. 1.

Referring to FIG. 3, a block may include a block number, number of transmission times, and transmission contents. According to the embodiment, the block number is numbered so that a value thereof is sequentially increased as blocks are generated. Accordingly, the block number may be used as a search term.

Depending on the embodiment, the search term entered from the user terminal 3 may be in the form of a QR code.

The user terminal 3 may scan the QR code, convert it into the search term corresponding to the QR code, and transmit information about the converted search term to the blockchain search server 2.

Herein, the user terminal 3 may be a mobile phone having a QR code scanner function or may be used in connection with a separate QR code scanner.

Since the above-mentioned hash value or block number is long in length and complicated, the user may enter the same incorrectly. Meanwhile, since the search term may be entered in a simple way through a QR code scanner when entering the search term in the form of a QR code, there is an advantage of excellent usability.

Figure 4:
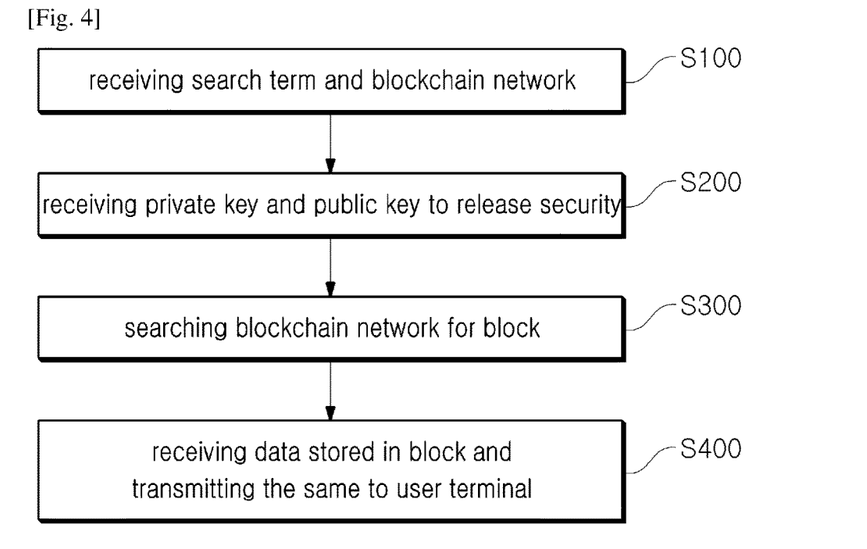
FIG. 4 is a flowchart showing a blockchain search method according to an embodiment of the present invention.

FIG. 4 is a flowchart showing a blockchain search method according to an embodiment of the present invention.

Referring to FIG. 4, the blockchain search method according to an embodiment of the present invention includes receiving a search term for identifying a block from a user terminal, and selecting a blockchain network to be searched from among multiple blockchain networks (S100); receiving a private key from the user terminal and releasing the security of the selected blockchain network using the received private key and public key (S200); searching the selected blockchain network for a block corresponding to the search term by accessing the selected blockchain network and entering the search term (S300); receiving data stored in the found block from the selected blockchain network and transmitting the received data to the user terminal (S400).

First, a user enters a search term for identifying a block into the user terminal 3, and selects a blockchain network to be searched from among multiple blockchain networks (S100).

The search term is a value capable of identifying a block, such as a hash value or a block number of the block. In addition, the search term may be input in the form of a QR code as well as text.

The multiple blockchain networks may be operated on different operating entities, such as Facebook's Libra, Kakao's Clayton, and NaverLine's Link.

Step S100 may include receiving the search term from the user terminal and providing the user terminal with blockchain network candidates in which a block is capable of being searched for using the search term on the basis of a type of the search term; and selecting one from among the blockchain network candidates as the blockchain network by the user terminal.

The type of the search term may be, for example, the length of input text. For example, when a blockchain network A uses a hash value represented by 12 characters of text, and a blockchain network B uses a block number represented by 10 characters of text, the blockchain network A or the blockchain network B may be provided as the blockchain network candidate based on the length of the input text.

Next, the blockchain search server 2 receives a private key from the user terminal, and releases the security of the selected blockchain network using the received private key and public key (S200).

Blocks in the blockchain network may be encrypted using the private key and the public key. Accordingly, the blockchain search server 2 receives the private key and public key from the user terminal 3, and release the security of the selected blockchain network using the received private key and public key.

Next, the blockchain search server 2 accesses the selected blockchain network and inputs the search term, so that the block corresponding to the search term is searched for in selected blockchain network (S300).

Each blockchain network 1-1, 1-2, 1-3 constituting the multiple blockchain networks 1 may include a search server (not shown) that searches for a block corresponding to the search term. The blockchain search server 2 may input the search term in the search server of the selected blockchain network, to cause a block corresponding to the search term to be searched for by the search server of the selected blockchain network.

Next, the blockchain search server 2 receives data stored in the searched block from the selected blockchain network and transmits the received data to the user terminal (S400).

According to an embodiment, when the data stored in the found block is a URL link, the blockchain search server 2 may access a specific data storage server corresponding to the URL link to transmit data received from the specific data storage server to the user terminal 3. Herein, the received data may be an image or a video.

In the case of an image or a video file, each node of the blockchain network 1 may store the same directly in the block. However, because the image or video file has a large capacity, it may be stored on other data storage servers, and only a location of the data storage server where the image or video files are stored may be stored in the block.

According to this embodiment, when the location of the data storage server is stored in the found block, the blockchain search server 2 does not transmit the location of the data storage server to the user terminal 3 as it is, but directly access the data storage server to receive the image or video file and transmit the received image or video file to the user terminal 3.

According to an embodiment, when data stored in the found block indicates a specific service, the blockchain search server 2 may execute the client of a specific service and transmit the received data to the user terminal 3. The specific service may be any one of a messenger service, a news service, a music service, and a game.

According to this embodiment, the data stored in the block may represent a specific service, and herein, the blockchain search server 2 can execute a specific service using the web or application. Accordingly, when data is transmitted from a server providing the specific service, the data may be transferred to the user terminal 3. According to this embodiment, a user can be provided with a service by searching a blockchain network for a block without having to execute a separate service.

Figure 5A:
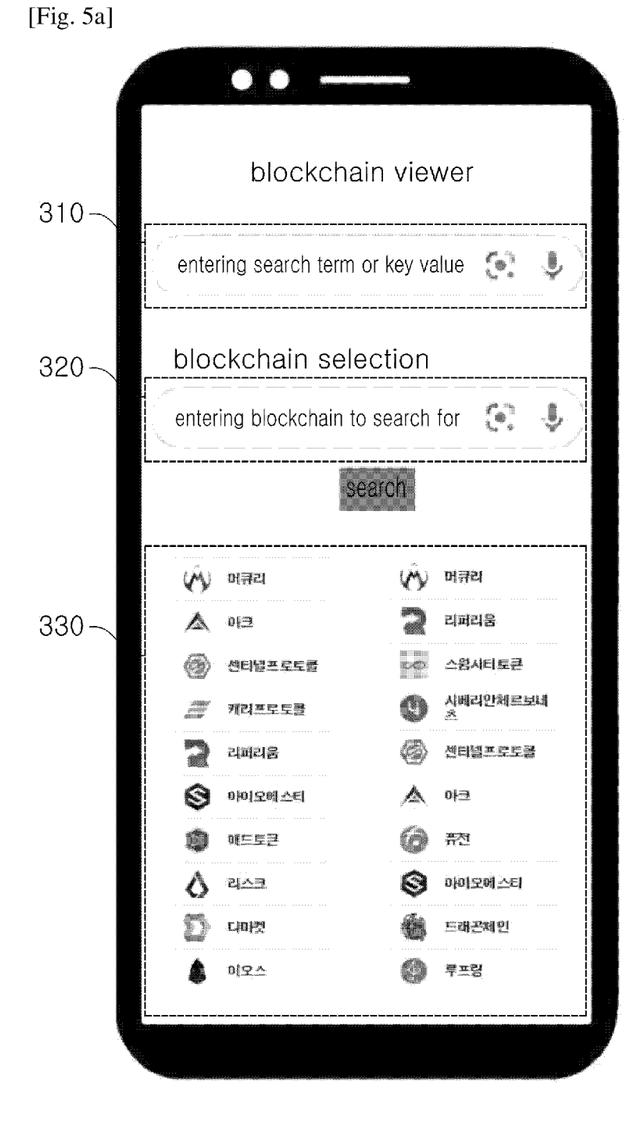
FIGS. 5A, 5B and 5C are diagrams showing screens of user terminals in which a blockchain search method is implemented according to an embodiment of the present invention.
Figure 5B:
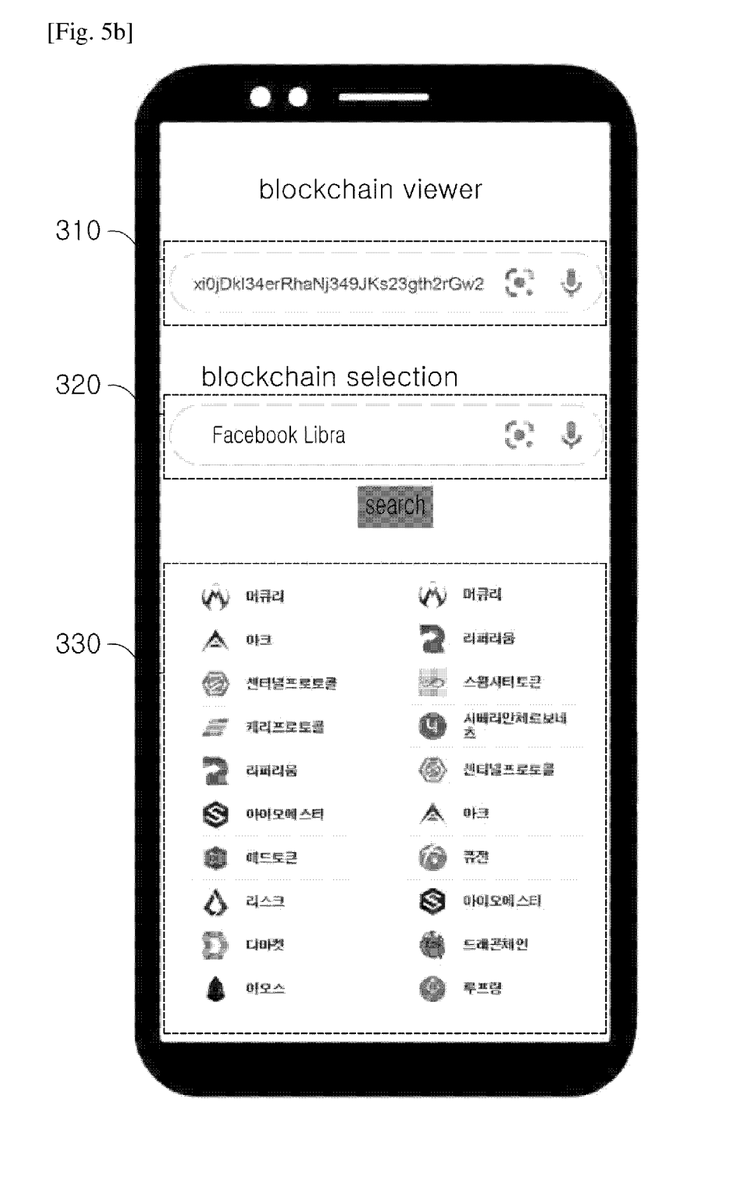
Figure 5C:
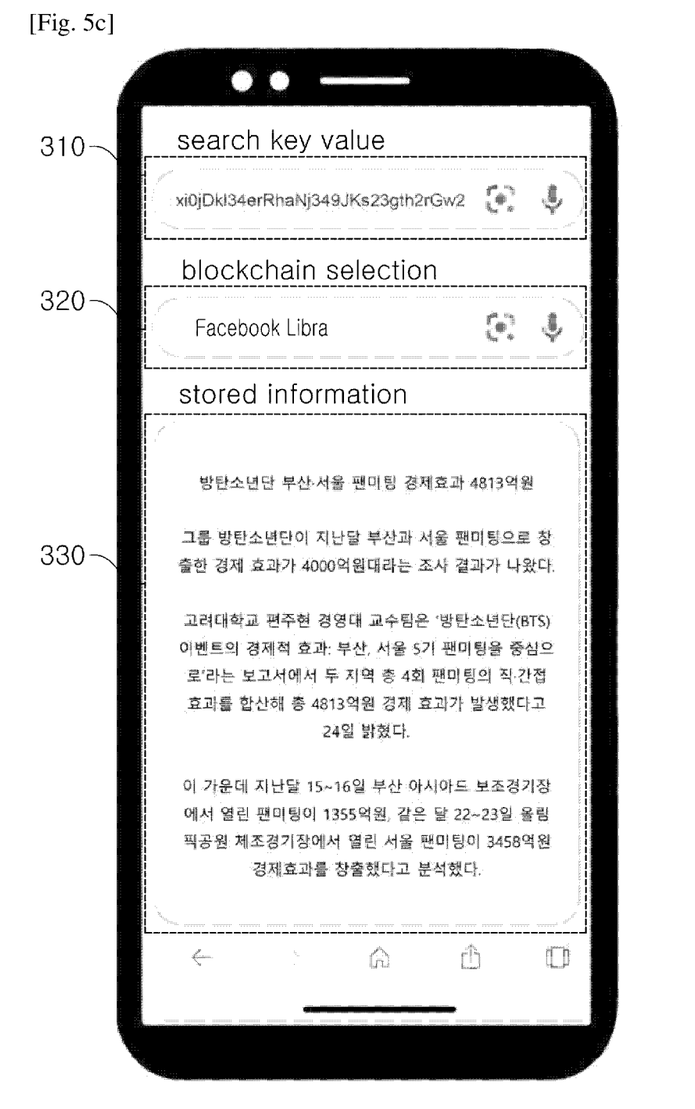

FIGS. 5A, 5B and 5C are diagrams showing a screen of a user terminal in which a blockchain search method is implemented according to an embodiment of the present invention.

As shown in FIG. 5A, a screen of a user terminal 3 is provided with a search term input window 310, a blockchain network input window 320, and blockchain network candidates 330.

Accordingly, the user enters a search term such as a hash value or a block number into the search term input window 310. The user may directly enter a name of the blockchain network into the blockchain network input window 320, or select any one from among the blockchain network candidates 330.

A view in FIG. 5B is a screen showing a state in which a search term and a blockchain network are input, followed by the screen of FIG. 5A.

A view in FIG. 5C is a screen showing a search result, followed by the screen of FIG. 5B.

In the blockchain network entered into the blockchain network input window 320, the data stored in the block found using the search term, which is entered into the search term input window 310, appears in a search result window 340 of FIG. 5c. Herein, the data stored in the block may be a text.

Figure 6:
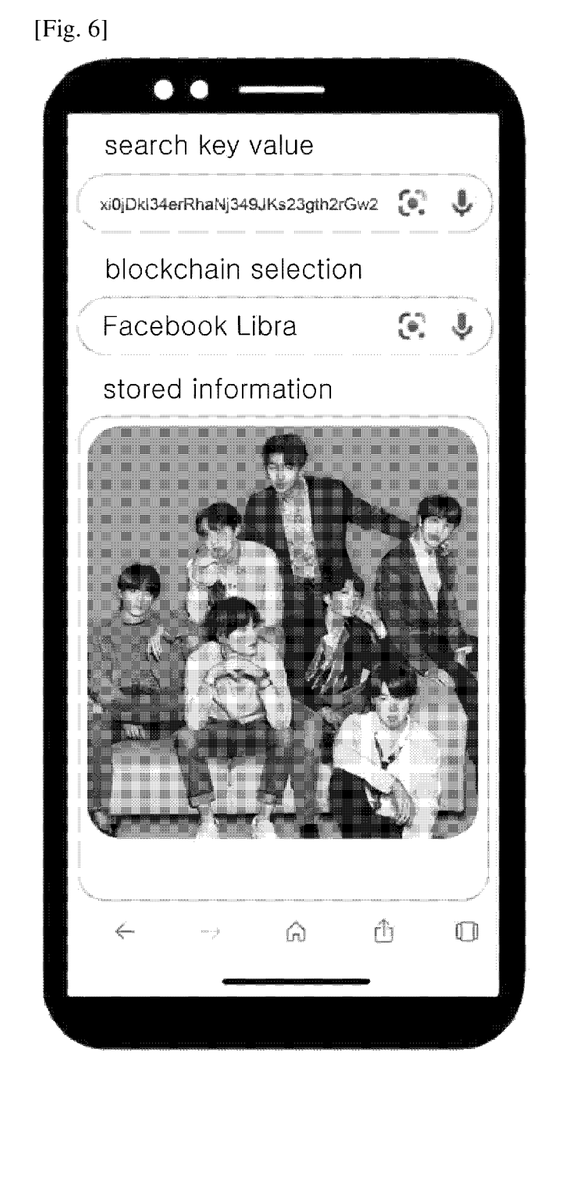
FIG. 6 is a diagram showing a screen of a user terminal in which a blockchain search method is implemented according to an embodiment of the present invention, which is a screen showing other search results.

FIG. 6 is a diagram showing a screen of a user terminal in which a blockchain search method is implemented according to an embodiment of the present invention, which is a screen showing other search results.

In FIG. 6, the data stored in the block is a URL link, and the blockchain search server 2 may access a specific data storage server corresponding to the URL link to receive an image file and transmit the same to the user terminal 3. Accordingly, an image is displayed in the search result window of the user terminal 3, so that the user can directly check the image from the user terminal 3.

Figure 7:
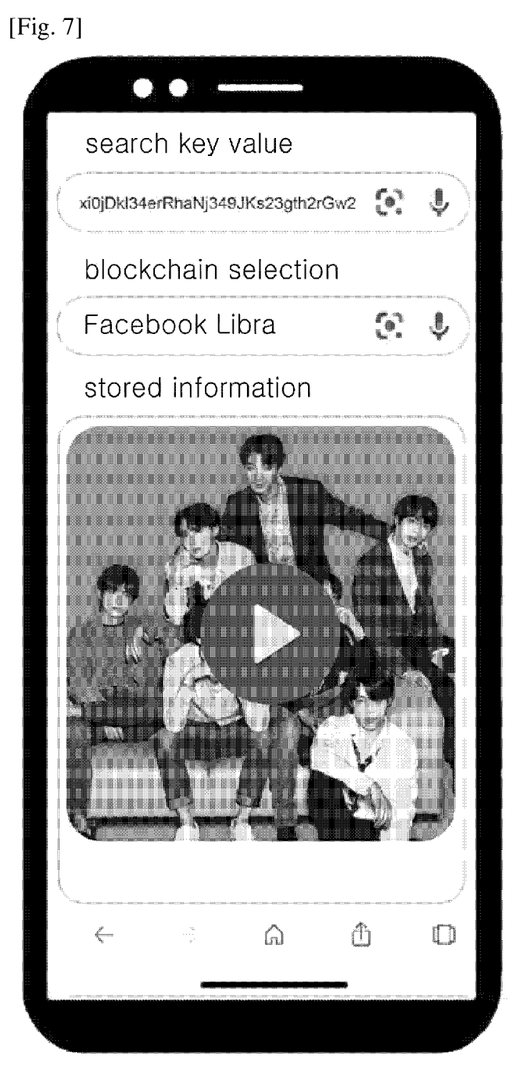
FIG. 7 is a diagram showing a screen of a user terminal in which a blockchain search method is implemented according to an embodiment of the present invention, which is a screen showing other search results.

FIG. 7 is a diagram showing a screen of a user terminal in which a blockchain search method is implemented according to an embodiment of the present invention, which is a screen showing other search results.

In FIG. 7, the data stored in the block is a URL link, and the blockchain search server 2 may access a specific data storage server corresponding to the URL link to receive a video file and transmit the same to the user terminal 3. Accordingly, the video is displayed in the search result window of the user terminal 3, and the user may play the video directly from the user terminal 3.

Figure 8:
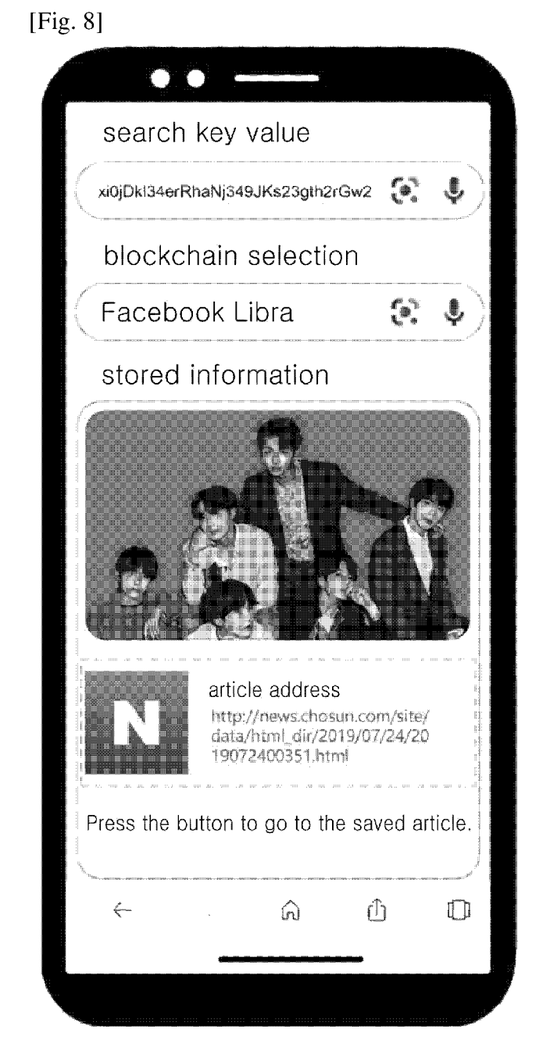
FIG. 8 is a diagram showing a screen of a user terminal in which a blockchain search method is implemented according to an embodiment of the present invention, which is a screen showing other search results.

FIG. 8 is a diagram illustrating a screen of a user terminal in which a blockchain search method is implemented according to an embodiment of the present invention, which is a screen showing other search results.

The data stored in the block in FIG. 8 represents a news providing service, and the blockchain search server 2 may access a server providing the news providing service to transmit the received file to the user terminal 3. Accordingly, a screen provided by the news providing service appears in the search result window of the user terminal 3, in which some images of news and some website addresses for news may be displayed, as illustrated in FIG. 8.

The present invention has been described in detail through preferred embodiments, but the present invention is not limited thereto. It is apparent to those skilled in the art that various modifications and applications can be made without departing from the spirit of the present invention. Therefore, it should be interpreted that the true protection scope of the present invention should be interpreted by the following claims, and all technical ideas within the equivalent scope are included in the scope of the present invention.

The invention claimed is:

1. A blockchain data search method, comprising:
   receiving a hash value or a block number as a search term for identifying a block, the hash value or block number received from a user interface of a user terminal, and the hash value or block number comprising a value type of the search term as entered by a user,
   selecting a blockchain network based on the value type, the value type initiating a search for a blockchain network candidate from among multiple blockchain network candidates based on the value type of the search term;
   selecting, from the multiple blockchain network candidates, a blockchain network that has a same value type as the value type corresponding to the value type corresponding to the search term;
   searching the selected blockchain network to directly access the selected blockchain network without having to directly access blockchain networks of each of the multiple blockchain network candidates, the search comprising a search for a block corresponding to the search term within only the selected blockchain network;
   receiving data stored in the searched block from the selected blockchain network; and
   transmitting the received data to the user terminal.

2. The method of claim 1, wherein the search term is entered in a form of a QR code.

3. The method of claim 1, wherein the receiving includes:
   receiving the search term from the user terminal and then providing the user terminal with blockchain network candidates in which a block is capable of being searched for using the search term on the basis of a type of the search term; and
   selecting any one from among the blockchain network candidates as the blockchain network by the user terminal.

4. The method of claim 1, wherein the transmitting the received data to the user terminal includes, when the data stored in the found block is a URL link, accessing a specific data storage server corresponding to the URL link to transmit data received from the specific data storage server to the user terminal.

5. The method of claim 4, wherein the data received from the specific data storage server is an image or a video.

6. The method of claim 1, wherein the transmitting the received data to the user terminal includes, when the data stored in the found block indicates a specific service, executing a client of the specific service to transmit the received data to the user terminal.

7. The method of claim 6, wherein the specific service is at least one of a messenger service, a news providing service, a music providing service, and a game.

8. The method of claim 1, further comprising, between the receiving of the search term and the accessing of the selected blockchain network,
   receiving a private key from the user terminal, to release security of the selected blockchain network using the received private key and a public key.

* * * * *